No. 792,500. PATENTED JUNE 13, 1905.
C. F. COX, W. D. FREDRICK & H. BARD.
GLASS BLOWING MACHINE.
APPLICATION FILED APR. 1, 1903.

6 SHEETS—SHEET 1.

Witnesses:-
Chas D Cox
Herman E. Metius

Inventors:-
Charles F. Cox,
W. D. Fredrick,
Harry Bard,
by their Attorneys
Howson & Howson

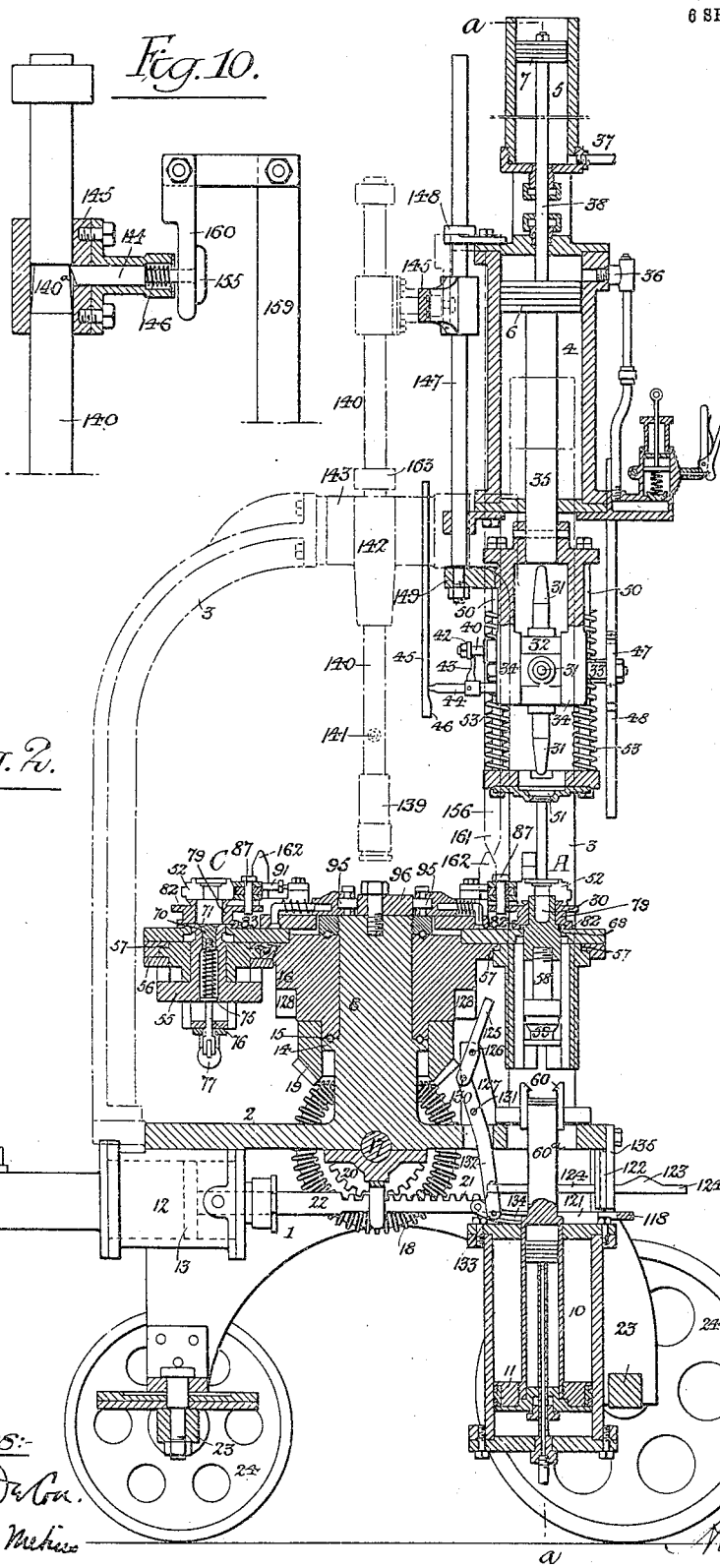

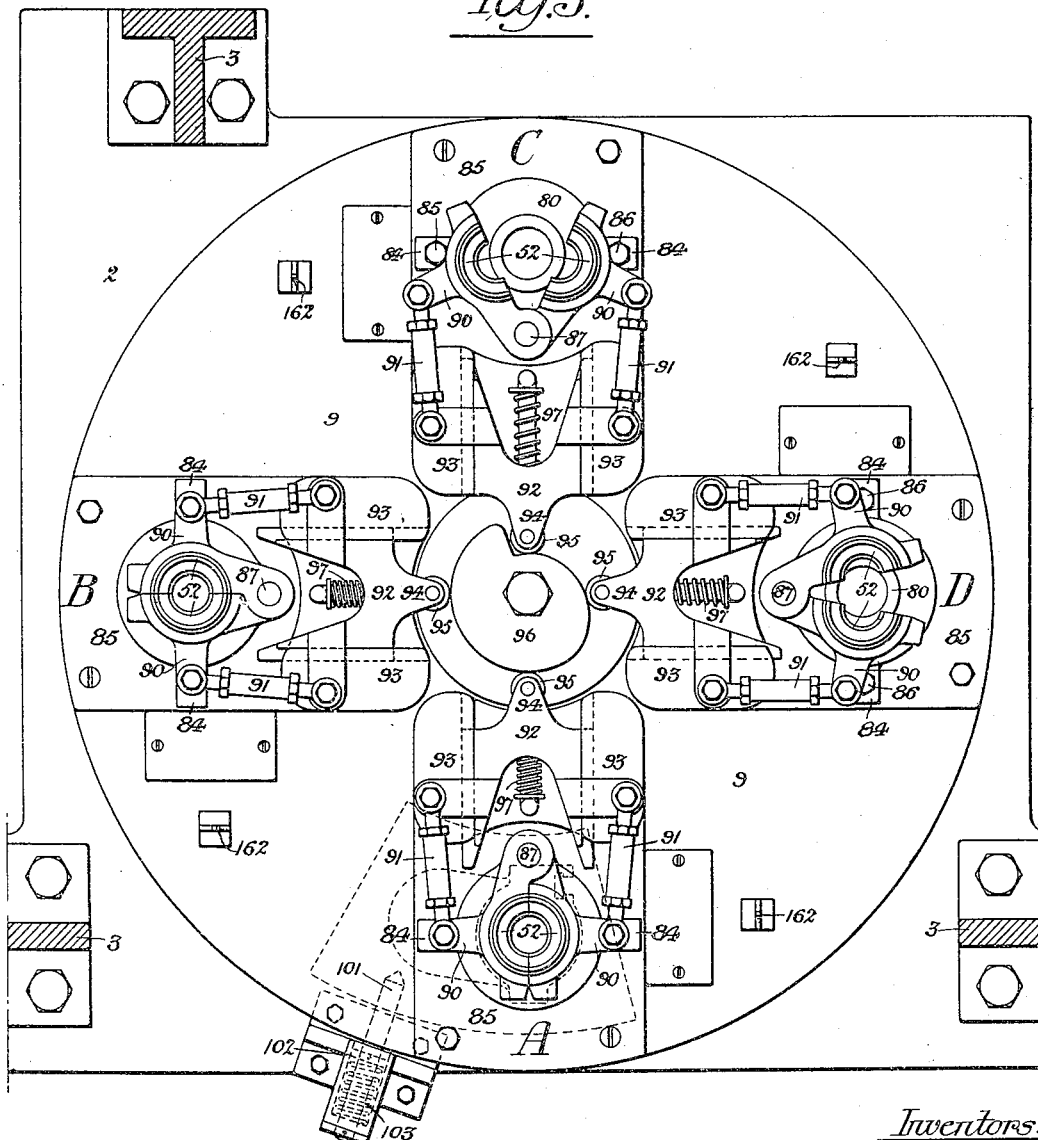

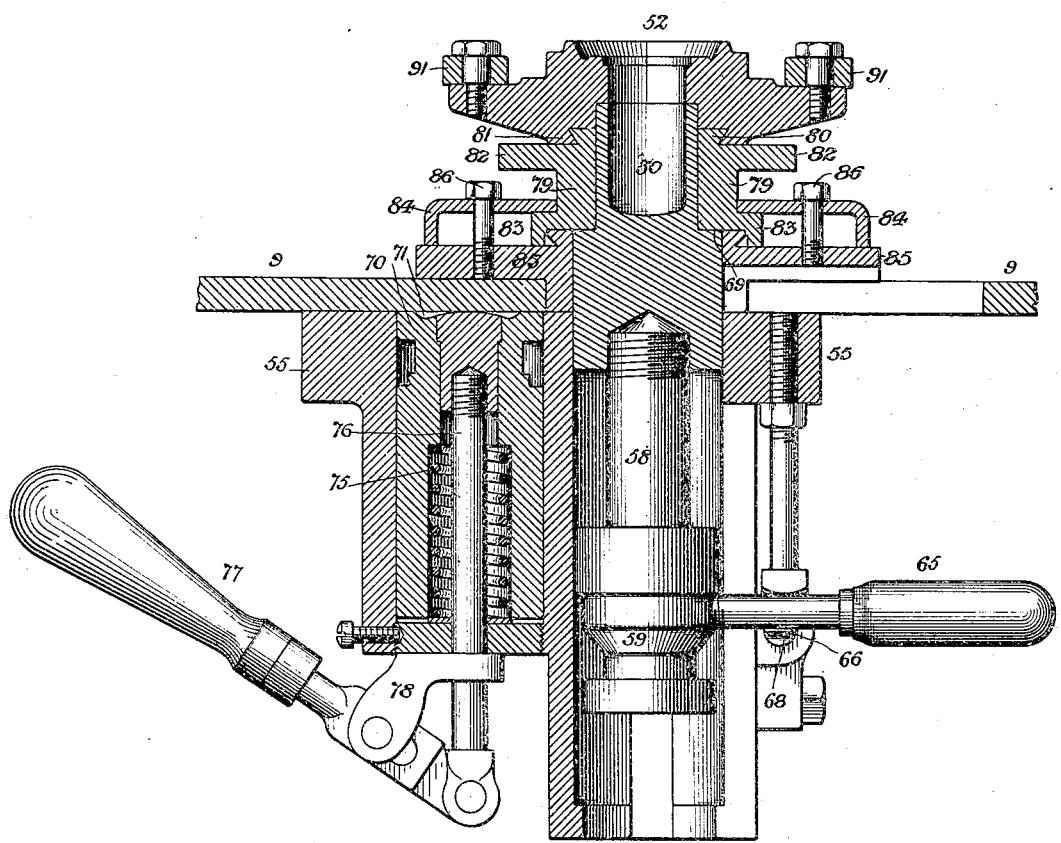

No. 792,500. PATENTED JUNE 13, 1905.
C. F. COX, W. D. FREDRICK & H. BARD.
GLASS BLOWING MACHINE.
APPLICATION FILED APR. 1, 1903.
6 SHEETS—SHEET 5.
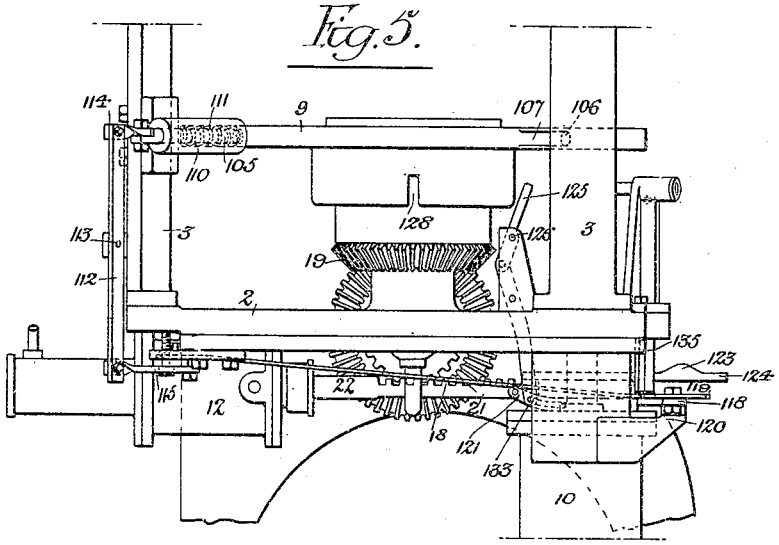
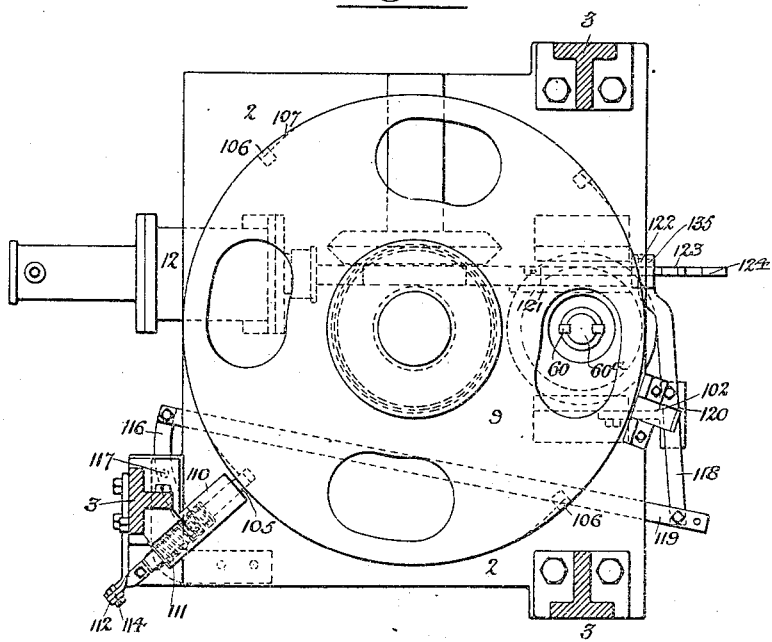
Witnesses:
Inventors
Charles F. Cox,
Wm. Dayton Fredrick,
Harry Bard,
by their Attorneys:
Howson & Howson No. 792,500. Patented June 13, 1905.

UNITED STATES PATENT OFFICE.

CHARLES F. COX AND WILLIAM DAYTON FREDRICK, OF BRIDGETON, AND HARRY BARD, OF MILLVILLE, NEW JERSEY, ASSIGNORS TO MILLVILLE MACHINE COMPANY, OF MILLVILLE, NEW JERSEY, A CORPORATION OF NEW JERSEY.

GLASS-BLOWING MACHINE.

SPECIFICATION forming part of Letters Patent No. 792,500, dated June 13, 1905.

Application filed April 1, 1903. Serial No. 150,607.

*To all whom it may concern:*

Be it known that we, CHARLES F. COX and WILLIAM DAYTON FREDRICK, of Bridgeton, and HARRY BARD, of Millville, Cumberland county, New Jersey, all citizens of the United States, have invented certain Improvements in Glass-Blowing Machines, of which the following is a specification.

Our invention relates to machines for blowing hollow glassware; and it consists of certain improvements in that class of apparatus designed to automatically effect the primary recessing and pressing of the charge of glass to form the article to be blown, the automatic rotation of a head carrying plungers for effecting this primary recessing or pressing, the movement of the table, the positioning of the blow-head over the molds, the withdrawal of the same, the automatic opening of the molds to permit removal of the finished articles, and the automatic closing of the molds ready to receive further supplies of the molten glass.

Other features of our invention will be pointed out hereinafter, reference being had to the accompanying drawings, in which—

Figure 1:
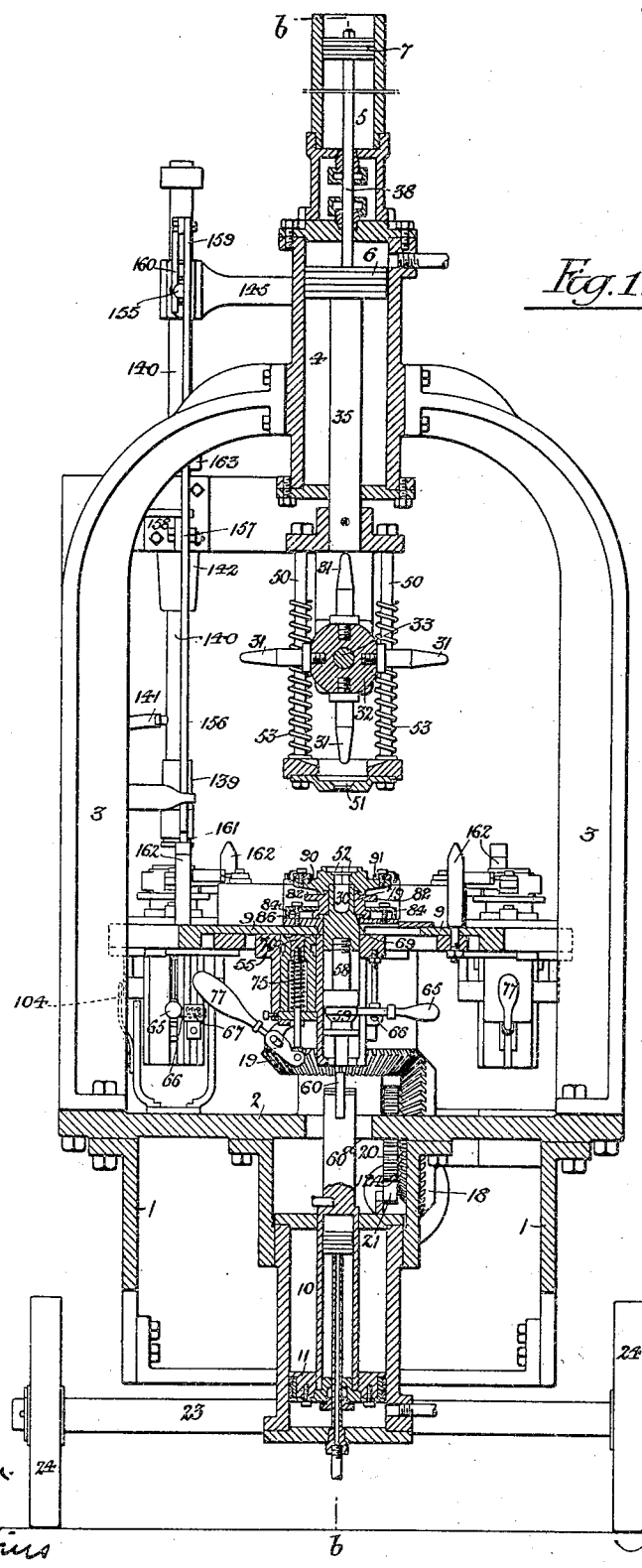
Figure 7:
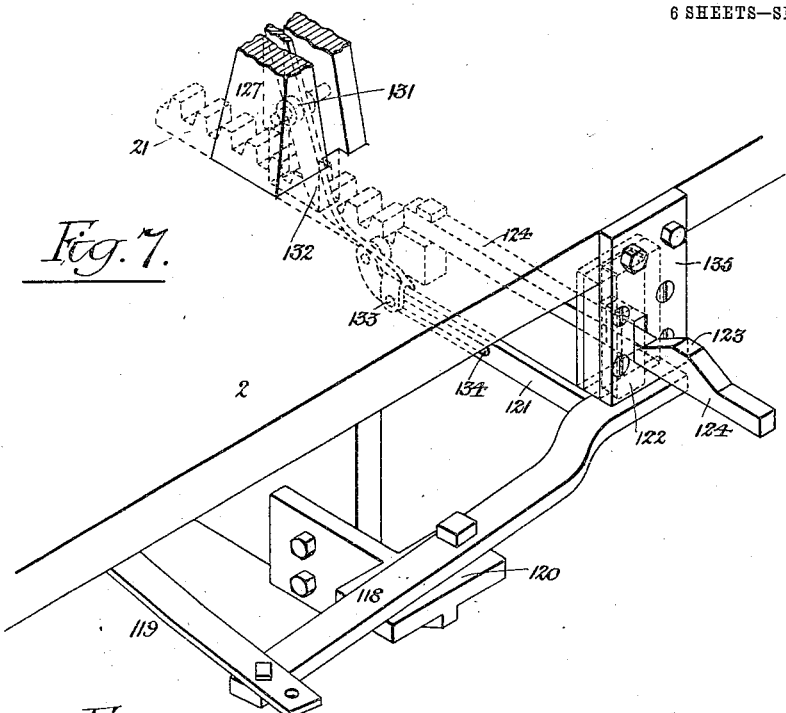
Figure 8:
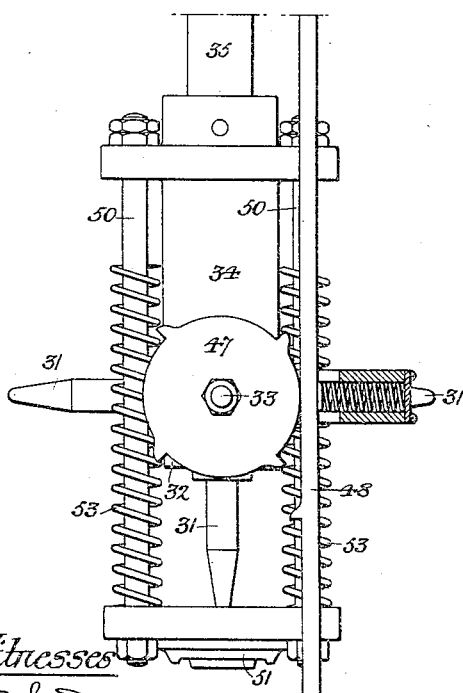
Figure 9:
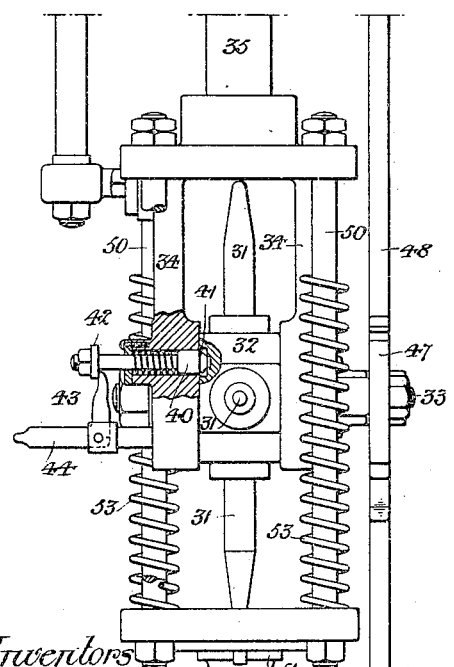

Figure 1 is a sectional front elevation of the machine forming the subject of our invention, taken on the line *a a*, Fig. 2. Fig. 2 is a sectional side elevation taken on the line *b b*, Fig. 1. Fig. 3 is an enlarged plan view of the mold-carrying table, showing the automatic means for opening and closing the molds. Fig. 4 is an enlarged sectional view of the combined press and blow mold structure. Fig. 5 is an elevation of a portion of the machine, showing the rotatable table and the means for actuating the locking-pin to hold the same during the intervals of rest. Fig. 6 is a plan view of the table and this mechanism. Fig. 7 is a perspective view illustrating certain details of this part of the mechanism; and Figs. 8, 9, and 10 are views illustrating other details of our invention.

In describing our improved machine we will refer to the parts of the same under several heads, which may be enumerated as follows: first, the carriage or supporting structure and framework of the machine; second, the plunger-head and its operating mechanism; third, the molds, mold-carrying table, and the mechanism for opening and closing the molds; fourth, mechanism for moving and locking the mold-carrying table; fifth, the blow-head and its operating mechanism.

*The carriage or supporting structure and framework of the machine.*—Our improved machine, together with its operating mechanism, is mounted upon a carriage or movable structure 1, having a fixed platform or table 2, which supports the frame 3, carrying the plunger mechanism, and the cylinders 4 and 5, containing the pistons 6 and 7 for operating said plunger mechanism. The table or platform 2 has a central stem 8, providing a bearing for the mold-carrying table 9. The carriage 1 also supports the lower cylinder 10 and its piston 11, the latter having means for engagement with a part of the mold structure, and a horizontal cylinder 12, having a piston 13, and connected mechanism which controls the movement of the table 9, all of which parts will be more fully described hereinafter. The central stem 8 is provided with a shoulder 14, recessed to receive a series of balls 15, forming a lower bearing for the hub 16 of the mold-carrying table. Mounted in suitable bearings formed in the frame of the carriage 1 and the fixed table 2 is a shaft 17, carrying a bevel gear-wheel 18, which meshes with a bevel gear-wheel 19, carried by the hub 16 of the table 9, and a pinion 20, the latter in engagement with a rack 21 on the end of the piston-rod 22, carrying the piston 13. The carriage is provided with axles 23, upon which are mounted the wheels 24, so that it may be readily moved to any part of the glass-house.

*The plunger-head and its operating mechanism.*—In blowing bottles the first thing to be accomplished is to effect the pressing of the neck portion of the same and to form the primary opening in the mass of glass which has been charged into the blank or press mold 30, and for this purpose we employ a series of plungers 31, carried by a rotatable head or hub 32, which hub is so arranged and connected as to be rotated after each depression, thereby bringing a fresh cool plunger into position to enter the mass of glass charged into each successive blank or press mold as they are brought into position. This mechanism is fully shown in Figs. 1, 2, 8, and 9. The plungers 31, of which there are four in the present instance, are carried by a head or hub 32, mounted upon a rotating spindle or shaft 33, journaled in suitable bearings in the frame 34, which frame is carried by the piston-rod 35, connected to the piston 6 within the cylinder 4. Pressure is admitted to this cylinder through the pipe 36, and after the glass has been poured into the blank or press mold at A, directly beneath the plunger-head, the latter is caused to descend, forcing one of the plungers into the glass within said mold, effecting the primary opening or recess in the glass and causing it to enter the top of the mold, thereby forming the mouth and neck of the bottle or other article under process of manufacture. After the aperture has been formed in the glass within the mold and the neck has been pressed into shape pressure is cut off from the main cylinder 4, and the constant pressure which is admitted to the auxiliary cylinder 5 above the main cylinder through the pipe 37 (which auxiliary cylinder has a piston of less area than the piston in the main cylinder and is connected to said latter piston by the piston-rod 38) raises the piston 7 and carries up the frame 34 and the plunger-head, thereby withdrawing the plunger from the mold. The plunger-head turns as it rises, bringing another plunger into position, and this action is accomplished by the following means: The rotatable head 32, carrying the plungers, is normally locked by means of a pin 40, carried by the frame 34 and arranged to enter a recess 41 in said head. This pin 40 is provided with a head 42, and engaging this head is a pivoted trip-lever 43, having a projection 44, operated by a depending rod 45 as the plunger-head is raised. This rod is carried by the frame 3 of the machine and is fixed in the position shown in Fig. 2, having a projection 46 arranged to engage the trip-lever 43 on the return movement of the head. This action withdraws the locking-pin and the plunger-head is free to be turned. A ratchet-wheel 47 is carried by the spindle 33 on the other side of the head, and when said head rises this ratchet-wheel is engaged by a pawl 48, carried by the cylinder 4, after the locking-pin 40 is released, thereby turning the head so as to bring a fresh plunger into position for use.

*The molds, mold-carrying table, and mechanism for opening and closing the molds.*— The frame 34 carries a series of sliding rods 50, supporting the ring-mold 51, which is first brought into engagement with the two-part mold structure 52, carried on the top of the table 9, and which forms the upper part of the bottle. The ring-mold is carried down with the plunger-head, and after it contacts with the mold structure 52 the further movement of the plunger-head compresses the springs 53, encircling the rods 50, supporting this ring-mold, such compression insuring the positive seating of the same.

Below the table 9 a series of sliding members 55 are carried, having flanges 56 to engage ways 57, arranged below said table, said members having a limited movement with respect to the table. These members carry a blank or press mold 30 and the blow-mold bottom, both of which are movable within the same, the blank or press mold fitting the recesses of the blow-molds carried on top of the table 9, while the bottom member is also arranged to fit the under side of the blow-mold casing. A stem 58 is secured to the blank or press mold, and this stem has a grooved head 59, which is engaged by fingers 60 when the mold is to be lowered after the primary pressing and recessing of the glass, such fingers being secured to the end of the piston-rod $60^a$, carrying the piston 11 within the lower cylinder 10. To raise or lower the blank or press mold by hand, a handle 65 is provided, and when this mold is in the raised position, as shown in Fig. 4, it is supported by means of a pin 66, controlled by a spring 67 and having the beveled faces 68 to permit the ready movement of the handle past the same. The blank or press mold has a shoulder or flange 69, which fits against the bottom of the blow-mold casing, and the internal diameter of the blank or press mold is the same as the two-part mold structure 52, in which the upper part of the article under process of manufacture is formed. Adjacent to this blank or press mold is a movable bottom 70 for the blow-mold, and when the blank or press mold is withdrawn from the blow-mold recess, leaving the glass-blank suspended from its upper portion within the blow-mold recess, this bottom member is to be fitted in place, said member being provided with an annular groove 71, which forms the bottom of the bottle or other article being blown and having an external diameter the same as the blank or press mold shoulder, so that it may be readily fitted into place and held in proper position. This bottom section of the blow-mold is upheld in engagement with the under side of the table 9 when not in use and against the blow-mold recess when in use by means of a spring 75 and is provided with a stem 76, to which a handle 77 is pivotally connected, such handle being journaled in a bracket 78, carried by the sliding member 55. When the blank or press mold is withdrawn after the formation of the pressed blank, the sliding member 55 is moved as the table moves, and the blow-mold bottom is thereby brought into position beneath the blow-mold recess. When centered beneath the same, the spring 75 causes it to rise into position, and the blow-mold is then ready to shape the article under process of manufacture when the blow-head is brought into position over the mold.

On the top of the table 9 the two-part molds 52 are carried, and the half-sections of these molds engage the upper portion of the blow-mold members 79, the latter having an undercut flange 80 to be engaged by the undercut flanges 81 of the half-sections of the two-part molds 52 to insure the proper seating of the latter with respect to the blow-mold members. The blow-mold members have a flange 82, which serves as a support for the half-sections of the two-part molds 52 as the latter are opened and closed, and a flange 83, which is engaged by clips 84, such clips being secured to the socket-plates 85 of the table by means of the bolts 86. The blow-mold members, with the exception of the bottom, are fixed with relation to the table 9. The two-part molds 52, however, are arranged to be opened as the table revolves and are constructed and arranged as follows: The sections of this mold are pivoted at 87, the pin forming such pivot being secured to the flange 82 of the blow-mold member. Each section has a side projection or arm 90, which is connected, by means of a link 91, with a slide-piece 92, adapted to suitable ways 93, carried by the socket-plates 85, and these slide-pieces have projections 94, which carry antifriction-rollers 95. At the center of the machine a fixed cam 96 is mounted, and the rollers 95, carried by the slide-pieces, are in engagement with this cam. As the table 9 is rotated the several slide-pieces are brought into engagement with this cam by means of the springs 97, and the shape of the same determines the position of the two-part molds. For instance, in Fig. 3 the molds indicated at A and B are closed, while those indicated at C and D are open. As the table is rotated these molds are alternately opened and closed.

*Mechanism for moving and locking the mold-carrying mechanism.*—As soon as the blank or press mold has been withdrawn from its position within the blow-mold recess, leaving the glass-blank suspended therein, the table is to be moved so as to bring a fresh mold into position to be operated upon. The table has a central hub 8, carrying a bevel-pinion 19, which meshes with a bevel-pinion 18, carried by the shaft 17. This shaft also carries a pinion 20, which is engaged by the racked extension 21 on the end of the piston-rod 22, carrying the piston 13 within the cylinder 12. As the lower piston pulls the blank or press mold out of the way pressure is admitted to the cylinder 12 to move the piston out to release the table-locking mechanism, but without moving the table, which piston is then retracted, thereby turning the bevel-pinions so that the table may be moved. The table begins its movement with both the blank or press mold and blow-mold bottom in the lowered position. As the table continues its movement a catch-pin 101, carried in a bracket 102, mounted on the frame of the machine and held in the forward position by a spring 103, acts against the sliding member 55, carrying the mold members, and moves the same in the arc of a circle struck from the axis of the mold-table's rotation, so as to bring the blow-mold bottom beneath the blow-mold recess, into which it is then raised by the spring 75. The table continues its movement, bringing the blank article within the mold beneath the blow-head. The table is then retarded by means of a spring brake-piece 104, carried by the fixed bed-plate of the machine, and as soon as it reaches the limit of its quarter-turn the table is automatically locked by means of the pin 105, entering one of the recesses 106 in the edge of the same. These recesses are beveled at 107 for a short distance, so that the pin may readily position itself as the table nears its limit of movement, and thereby insure the stopping of the table the instant it reaches the end of the quarter-turn. When the table is to be started again, the pin 105 is withdrawn, and this is accomplished by the following mechanism: The pin is mounted within a casing 110 and is provided with a spring 111, which is always in engagement to force it into one of the recesses of the table. A lever 112 is mounted at 113 on one of the uprights of the frame, and this lever is connected at its upper end 114 with the pin 105. At its lower end it is connected, by means of a link 115, with a lever 116, pivoted at 117, the latter in turn being connected to a lever 118 by means of a link 119, the said lever 118 being pivotally mounted on a bracket 120 at the front of the fixed table. The racked end 21 of the piston-rod has a link 121 connected to its forward end, and when the piston-rod is moved forward to its full extent this link engages and throws out the lever 118, which releases the spring-controlled pin 105 through the medium of the lever 112, link 115, lever 116, and link 119, all of which are operatively connected together in the manner just described. In this action as the lever 118 is thrown out it releases a catch-piece 122, and this piece dropping by gravity as soon as the lever is moved out of its way serves to hold the lever in this position with the pin 105 out of engagement with the table until the latter nears the limit of its travel, when the catch-piece will be lifted by a cam 123 on an extension 124, carried by the racked end of the piston-rod, as the latter is retracted. In addition to the pin 105 the table when in position of rest is held by means of a pawl 125, pivoted at 126 to a support 127, carried by the bed of the machine, and this pawl engages recesses 128, carried by the hub of the revolving table. It is necessary, of course, to release this pawl from its engagement with one of these recesses each time the table is to be moved, and this is accomplished by the following means when the rack-rod is moved forward: Connected to this pawl 125 at 130 and also pivoted at 131 to the support 127 is a lever 132, the opposite end of which has a pivotal connection 133 with the link 121, the latter being slotted at 134 for this pivot-pin. Such construction provides for a certain amount of lost motion between the parts, as the lever 132 is not operated to move the pawl out of engagement with one of the projections 128 until after the pin 105 has been released and the rack-rod has completed its full forward stroke.

The lever 118, which is operated to release the pin 105, is held in the position to keep this pin in place by means of the vertically-moving catch-piece 122, mounted in a casing 135. This catch-piece is controlled by the rod or extension 124, mounted on the end of the rack-rod, which rod or extension passes through an aperture 136 in said catch-piece and has a cam 123, which serves to raise this catch-piece as it is passed in and out of the same. When the catch-piece is raised on the forward movement of the rack-rod, the lever 118 is moved by the link 121, connected to the rack-rod, so as to release the pin 105 from engagement with the table, and when moved on the return stroke of the rack-rod the catch-piece is raised to permit the return of the lever 118 automatically after said locking-pin 105 has been seated. The pinion in engagement with the rack-rod moves idly on the forward movement, being provided with a clutch or pawl that is put into action on the return movement of said rack-rod, which return movement is the one by which the table is moved.

*The blow-head and its operating mechanism.*—The blow-head which we prefer to use is the same as that shown and claimed in the application of William Dayton Fredrick, filed January 29, 1903, Serial No. 141,038, and hence it is unnecessary to go into the details of its construction in this application. The means for supporting and operating the same, however, are as follows: The blow-head proper (indicated at 139) is carried by a spindle 140, which is hollow in the lower part and is provided with a pipe 141 for supplying air to said head. This spindle 140 is guided by a sleeve 142, mounted on a portion 143 of the upper frame of the machine and is supported in the raised and inactive position by means of a pin 144, mounted within an arm 145 and controlled by a spring 146, which pin engages a shoulder 140$^a$ on the spindle. The arm 145 is connected to a vertically-sliding rod 147, secured to the plunger-frame and having guides 148 and 149, carried by the cylinder 4. This pin 144 is provided with a head 155 and is moved to disengage the blow-head spindle by means of a lever 156, pivoted at 157 to a bracket 158, carried by the upper frame. This lever has an upper extension 159, with a pair of fingers 160 arranged adjacent to the head of the pin 144. At the lower end the lever is beveled at 161, and posts 162 are mounted on the mold-carrying table in position to engage the beveled ends of the levers and move the same so as to disengage the pin from the blow-head spindle 140. This action takes place just as the mold reaches its position beneath the blow-head, so that the latter can drop into place at the proper moment. The movement of the blow-head spindle is very slight, and an adjustable collar 163 is carried by the same, so as to limit its movement and prevent a jar when the blow-head drops onto the mold. When the plunger-head frame descends, carrying one of the plungers into the glass of the mold, the rod 147 is carried down, and with it the spring-controlled pin 144, which passes its point of engagement with the blow-head spindle. As soon as the plunger-head frame is raised the rod 147 is also raised, and when the pin contacts with the shoulder 140$^a$ of the blow-head spindle the latter is raised and the blow-head brought to its normal position, which it retains until the lever 156 is again acted upon by one of the posts 162.

The operation of the machine is as follows: At the position A (indicated on Fig. 3) the blank or press mold 30 is in place and is held up by the self-acting catch, the mold structure being over the lower plunger or piston 11, which rises and supports it, and glass is then charged into this press-mold. Pressure is then admitted to the main cylinder, and the plunger-head 32 is depressed, carrying one of the plungers 31 into the glass in the press-mold, forming the upper part of the bottle or other article under operation and making the primary recess in the mass of glass. Pressure is then turned off the main cylinder controlling the movement of the plunger-frame, and the constant pressure on the small cylinder above the same lifts said plunger-head 32, and as it is lifted the catch 40, which holds said frame, is tripped, permitting the turning of the same, thereby bringing another plunger into position to be forced into the charge of glass in the next press-mold brought into its place beneath the plunger. The lower piston is then depressed, drawing down and out of the way the press-mold 30, leaving the article suspended by its neck within the two-part mold 52, supported by the table. The mechanism for moving the table is operated after the depression of the lower piston, motive fluid having been admitted to the cylinder 12, containing the horizontally-moving piston 13, carrying racked member 21, which latter engages the pinion 20 on the shaft 17, carrying the vertical bevel gear-wheel 18, the latter meshing with the bevel gear-wheel 19, secured to the table whereby the latter is moved. As the table starts to turn the projection 101, carried by the frame of the machine and controlled by a suitable spring 103, engages the sliding member 55, carrying the blow-mold bottom 70, and moves it under the blank within the blow-mold recess, such mold-bottom automatically rising into its place under the action of the spring 75. The table then moves a quarter-turn and is partially stopped by spring-arm 104 on the frame of the machine, arranged alongside of and below the blow-head, said table being fully stopped when the locking-pin 105 seats itself in one of the recesses 106 in the edge of said table. As the table starts to move the lever mechanism controlling the locking-pin 105 is operated to retract the pin. As the table nears the end of its quarter-turn of movement the locking-pin mechanism is released and said pin drops into a recess 106 in the edge of the table, holding the latter in the proper place. Just as the table stops one of the projections, 162, carried by the top of the same, engages the lever 156, controlling the blow-head, releasing the same, and said blow-head drops onto the mold as the latter reaches the position B. As the plunger-head is again lifted the head is turned so as to present a cool plunger to be inserted in the fresh charge of glass. In the lifting action the trip on said head is engaged by a fixed depending member, which releases the locking-pin 40, permitting such turning. At the same time the rod 147, carried by the plunger-head, rises with it and carries up the bracket 145, mounted on the blow-head spindle 140, which spindle remains stationary until the locking-pin 144, supported in said bracket and controlled by the spring 146, engages the shoulder 140ª on said spindle and lifts and holds the latter in the raised position. As the blow-mold having the article under operation reaches position C of the table the upper mold is automatically opened by the spring 97 as soon as it passes the high portion of the cam mounted at the center of the mold-carrying table. The operator then removes the finished article, drops the bottom of the blow-mold, and moves the same to one side and then raises the press or blank mold into position, as shown at D, the upper two-part mold being partially closed, and when moved to the position shown at A it will be entirely closed to receive the next charge of glass. There is constant pressure passing to the small cylinder 5, having the tendency to keep the plunger-frame in the raised position, to the small cylinder 12ª at the rear of the horizontal cylinder 12 beneath the mold-carrying table, which cylinders are paired in the same manner as the cylinders 4 and 5, the discharge from the latter being controlled by a valve that is automatically opened and closed as the blow-head engages and leaves the mold.

Having thus described our invention, we claim and desire to secure by Letters Patent—

1. A glass-blowing machine having fluid-operated plungers for effecting the primary recessing of the glass under operation, a main piston for depressing said plungers, and an auxiliary piston of less diameter and mounted above the main piston for raising the plungers.

2. The combination with a glass-blowing machine having molds to receive the glass, of a series of fluid-operated plungers for effecting the primary recessing of the glass under operation, a head carrying said plungers, a main piston for depressing said head, and an auxiliary piston of less diameter and mounted above the main piston for raising the head.

3. The combination with a glass-blowing machine having molds to receive the glass, of a rotatable head, fluid-operated plungers carried thereby for effecting the primary recessing of the glass under operation, a main piston for depressing said head, an auxiliary piston of less diameter and mounted above the main piston for raising said head, and means for rotating the latter.

4. The combination in a glass-blowing machine, of the mold-carrying table, molds therein arranged to receive the charge of glass, means for moving the table, fluid-operated plungers for effecting the primary recessing of the glass as the molds are brought into position beneath the same, a main piston for depressing said plungers, and an auxiliary piston of less diameter and mounted above the main piston for raising the plungers.

5. The combination in a glass-blowing machine, of the mold-carrying table, molds carried thereby and arranged to receive the charge of glass, fluid-operated plungers for effecting the primary recessing and pressing of such glass, ring-molds arranged to be carried down with said plungers when they are depressed, a main piston for depressing the plungers, and an auxiliary piston of less diameter and mounted above the main piston for raising the plungers.

6. The combination in a glass-blowing machine, of the mold-carrying table, molds carried thereby and arranged to receive the charge of glass, fluid-operated plungers for effecting the primary recessing and pressing of such glass, molds arranged to be carried down by the plungers, two-part mold structures carried by the table and engaged by those carried down by the plungers, said two-part molds being automatically opened and closed as the table is moved, a main piston for depressing the plungers, and an auxiliary piston of less diameter and mounted above the main piston for raising the plungers.

7. The combination in a glass-blowing machine, of the mold-carrying table, molds carried thereby and arranged to receive the charge of glass, fluid-operated plungers for effecting the primary recessing and pressing of such glass, molds arranged to be carried down by the plungers, two-part mold structures carried by the table and engaged by those carried down by the plungers, means for automatically opening and closing said two-part molds as the table is moved, a main piston for effecting the downward movement of the plungers, and an auxiliary piston of less diameter and mounted above the main piston for raising the plungers.

8. The combination in a glass-blowing machine, of the mold-carrying table, molds therein arranged to receive the charge of glass, plungers arranged to be forced into said glass, a head for carrying said plungers, means for locking the same at intervals, a main piston for depressing said head, and an auxiliary piston of less diameter and mounted above the main piston for raising the head.

9. The combination in a glass-blowing machine, of the mold-carrying table, molds therein arranged to receive the charge of glass, plungers arranged to be forced into said glass, a head for carrying said plungers, a main piston for lowering said head, an auxiliary piston of less diameter and mounted above the main piston for raising the head, means for locking said head at intervals, and automatic means for releasing the locking mechanism as the head is raised.

10. The combination in a glass-blowing machine, of the mold-carrying table, molds therein arranged to receive the charge of glass, plungers adapted to be forced into said glass, a head carrying said plungers, a main piston for lowering said head, an auxiliary piston of less diameter and mounted above the main piston for raising the head, means for locking said head, and means for unlocking and rotating said head after each depression.

11. The combination in a glass-blowing machine, of the mold-carrying table, molds therein arranged to receive the charge of glass, plungers arranged to be forced into said glass, a head carrying said plungers, a main piston for lowering said head, an auxiliary piston of less diameter and mounted above the main piston for raising said head, means for locking said head, means for releasing the locking mechanism as the head is raised, and means for rotating said head when the locking mechanism has been released.

12. The combination in a glass-blowing machine, of the mold-carrying table, molds carried thereby, sliding mold-carrying members mounted therein each carrying a blank or press mold and a blow-mold bottom, and means for changing the position of such mold and bottom with respect to the molds carried by the table.

13. The combination in a glass-blowing machine, of the mold-carrying table, molds carried thereby, sliding mold-carrying members mounted therein each carrying a blank or press mold and a blow-mold bottom, means for withdrawing the blank or press molds from the molds carried by the table, and means for automatically bringing the blow-mold bottoms into place with respect to said molds.

14. The combination in a glass-blowing machine, of the mold-carrying table, molds mounted thereon each having a blow-mold recess, a blank or press mold fitting said recess and movable into and out of the same, a movable bottom for the blow-mold recess operatively connected to said blank or press mold, means for moving said blank or press mold and blow-mold bottom into operative relation with the blow-mold, and means for supporting said structures in the operative positions.

15. The combination in a glass-blowing machine, of the mold-carrying table, molds mounted thereon, each having a blow-mold recess, a blank or press mold fitting said recess and movable into and out of the same, a movable bottom for the blow-mold recess, and a sliding member carrying said bottom and the blank or press mold in definite relation with each other and arranged to bring either of said members into registry with the blow-mold recess.

16. The combination in a glass-blowing machine, of the mold-carrying table, molds mounted thereon each having a blow-mold recess, a blank or press mold and a blow-mold bottom mounted in definite relation with each other and arranged to register alternately with the blow-mold recess, means for supporting the blank or press mold, means for withdrawing the same after the recess in the article has been formed, and means for automatically bringing the blow-mold bottom into place.

17. The combination in a glass-blowing machine, of the mold-carrying table, molds mounted thereon each having a blow-mold recess, a blank or press mold and blow-mold bottom, arranged to register alternately with the blow-mold recess, means for supporting the press-mold, a rod with engaging fingers for withdrawing the blank or press mold after the recess in the article has been formed, and a projection mounted on the frame of the machine for automatically moving the mold-carrying structure and bringing the blow-mold bottom into place.

18. The combination in a glass-blowing machine, of the mold-carrying table, means for moving the same, molds carried thereby, a blow-head adapted to engage said molds, and automatic means operated by the moving table for releasing said blow-head whereby it may drop into position.

19. The combination in a glass-blowing machine, of the mold-carrying table, means for moving the same, molds carried thereby, a blow-head adapted to engage said molds, a spring-controlled pin supporting said blow-head, and automatic means operated by the table for releasing said pin whereby the blow-head may drop into position.

20. The combination in a glass-blowing machine, of the mold-carrying table, means for moving the same, molds carried thereby, a blow-head adapted to engage said molds, a carrier for said blow-head having a supporting-pin, a tripping device arranged to act on said pin, and means carried by the table for releasing said tripping device whereby the blow-head may be dropped into position.

21. The combination in a glass-blowing machine, of the mold-carrying table, means for moving the same, molds carried thereby, a blow-head adapted to engage said molds, a carrier for said blow-head having a supporting-pin, a tripping device arranged to act on said pin, a pivoted lever carrying said tripping device, and posts carried by the table for releasing said tripping device whereby the blow-head may be dropped into position.

22. The combination in a glass-blowing machine of a revolving mold-carrying table, a blow-head adapted to engage the molds carried by said table, a supporting-pin for said blow-head, a plunger-frame, a rod carried by said plunger-frame and connected to the blow-head rod, and a pin carried by said plunger-frame rod, said pin arranged to engage the blow-head rod after the latter has been depressed and raise it with the plunger-frame.

23. The combination of the blow-head rod, a guide for the same, a movable guide, a supporting-pin carried by said guide, a lever, an arm carried by said lever and arranged to engage the pin, a table, and posts carried by said table and engaging the lever whereby the blow-head rod may be released.

24. The combination of the blow-head, the plunger-head frame, a rod carried by the latter, a rod supporting the blow-head, a connection between said rods, a pin carried by said connection and engaging the blow-head rod whereby the latter may be supported, means for releasing said pin whereby the blow-head may descend, and means for carrying down the plunger-frame rod whereby said pin may be brought into engagement with the blow-head rod and raised with said plunger-frame.

25. The combination in a glass-blowing machine, of the mold-carrying table, molds carried thereby, two-part molds operatively connected thereto, a cam for closing said two-part molds, headed stems connected to the molds and engaging said cam, and springs interposed between said stems and the molds whereby the supplementary molds will be opened during a portion of the rotation of said table.

26. The combination in a glass-blowing machine, of the mold-supporting structure carrying the press or blank mold, means for holding the press-mold in the upper portion of said structure, a vertically-moving rod, and a connection between said rod and the press or blank mold whereby it may be automatically depressed.

27. The combination in a glass-blowing machine, of the mold-supporting structure carrying the press or blank mold, means for holding the press-mold in the upper portion of said structure, a vertically-moving rod, and clutch-fingers carried by said rod and arranged to engage the press or blank mold whereby it may be automatically depressed.

28. The combination in a glass-blowing machine, of the movable mold structure carried by the table, a press or blank mold and blow-mold bottom carried by the same, means for depressing the press or blank mold, means for moving said mold structure to bring the blow-mold bottom into position and means for raising said bottom to its seat.

29. The combination in a glass-blowing machine, of the table, a movable mold structure carried by the same, a press or blank mold and blow-mold bottom carried by the same, means for depressing the press or blank mold, a projection to engage the mold structure as the table moves and serving to bring the blow-mold bottom into position, and a spring for raising said bottom to its seat.

30. The combination in a glass-blowing machine, of the mold-carrying table, means for moving the same, a locking device for the table, a lever connected to the same, a cylinder mounted below the table and having a piston, and a rod connected to said piston and arranged to engage said lever whereby the locking device may be released.

31. The combination in a glass-blowing machine, of the mold-carrying table, bevel gear-wheels for moving the same, a rod, means for moving said rod, a racked rod carried thereby, a pinion engaging said racked rod, and mounted on the shaft of one of the gear-wheels, a locking device, a lever controlling the same, and means controlled by the racked rod to release said lever and permit movement of the table.

32. The combination in a glass-blowing machine, of the mold-carrying table, bevel gear-wheels for moving the same, a plunger, means for moving said plunger, a racked rod carried thereby, a pinion engaging said racked rod and mounted on the shaft of one of the gear-wheels, a locking device, a lever controlling the same, means controlled by the racked rod to release said lever and permit movement of the table, and a supplementary lock or detent released on the full forward movement of the racked rod.

33. The combination of the mold-carrying table, a locking-pin for the same, a lever to which said pin is connected, a second lever, a connection between the same, a spring for holding said pin in engagement with the table, a latch-piece resting on the second lever, and means for moving said second lever whereby the locking-pin will be released, said latch-piece preventing the return of the second lever until it is lifted.

34. The combination of the table, a locking-pin for the same, a lever carrying said pin, a second lever, a spring connected to the pin for holding the same in engagement with the table, a movable rod for engaging said second lever, a catch-piece for preventing the return of such lever until it has been removed to release the locking-pin, and a cam operatively connected to the rod engaging said second lever, said cam serving to raise the catch-piece and permit the return movement of the second lever and the setting of the locking-pin.

35. The combination of the mold-carrying table, a hub for the same, recesses in said hub, a detent or latch adapted to engage said recesses, a rod, a slotted arm carried by said plunger, and a connection between said arm and the detent whereby the latter will be moved each time the connection contacts with the end of the slot.

36. The combination in a glass-blowing machine, of the mold-carrying table, molds therein arranged to receive the charge of glass, plungers arranged to be forced into the glass in such molds, a head for carrying the same, a locking-pin for said head, means for raising and lowering the head, and a trip for releasing the locking-pin mechanism as the head is raised.

37. The combination in a glass-blowing machine, of the mold-carrying table, molds therein arranged to receive the charge of glass, plungers adapted to be forced into said glass, a head carrying the same, a locking-pin for said head, a spring for acting on said pin, means for raising and lowering the head, a trip-lever for the locking-pin, and a fixed member for engagement with said trip-lever.

38. The combination in a glass-blowing-machine, of the mold-carrying table, molds therein arranged to receive the charge of glass, plungers adapted to be forced into said glass, a head carrying the same, a frame carrying said head, means for locking said plunger-head, means for raising and lowering the head, means for releasing the locking mechanism as the head is raised, a ratchet-wheel carried by said head, and a pawl carried by the frame, said pawl serving to move the ratchet-wheel each time the plunger-head rises.

39. The combination in a glass-blowing machine, of the mold-carrying table, molds therein arranged to receive the charge of glass, plungers adapted to be forced into said glass, a head carrying the same, means for locking said plunger-head, means for raising and lowering the head, means for releasing the locking mechanism as the head is raised, a ratchet-wheel carried by said head, a pawl mounted so as to yield as the ratchet-wheel passes the same in one direction, and a spring for keeping said pawl normally in the operative position.

40. The combination in a glass-blowing machine, of the mold-carrying table, molds mounted thereon each carrying a blank or press mold and a blow-mold bottom, means for withdrawing the blank or press mold, and a spring-controlled pin for supporting said mold in place.

41. The combination in a glass-blowing machine, of the mold-carrying table, molds mounted thereon each having a blow-mold recess, a blank or press mold fitting said recess and movable into and out of the same, a handle connected to said blank or press mold, a spring-controlled pin for engagement with said handle to support the mold, and means for moving said mold into and out of place, said pin having a beveled end permitting ready engagement or disengagement with the handle of the mold.

42. The combination in a glass-blowing machine, of the mold-carrying table, molds carried thereby, a blow-head arranged to be moved by gravity into engagement with said molds, a bolt for supporting said blow-head in the normal position, a lever for tripping said bolt and projections carried by said table for engaging the trip-lever at regular intervals.

43. The combination in a glass-blowing machine, of the mold-carrying table, means for moving the same, a locking device for the table, means for causing said locking device to engage the table, and a brake for retarding the movement of the table as it nears the point for the engagement of the locking device.

44. The combination in a glass-blowing machine, of the mold-carrying table rotatably mounted, and mold-carrying structures supported by said table and having movement independently of the latter in an arc of a circle struck from the axis of rotation of said table.

45. The combination in a glass-blowing machine, of the mold-carrying table rotatably mounted and duplex mold-carrying structures supported by said table, said mold-carrying structures having limited movement in two directions independently of the table, such movement being in the arc of a circle struck from the axis of rotation of said table.

In testimony whereof we have signed our names to this specification in the presence of two subscribing witnesses.

CHAS. F. COX.
    W. DAYTON FREDRICK.
    HARRY BARD.

Witnesses:
 WM. A. LOGUE,
 FRANK P. LOGUE.